(No Model.)
R. E. LEHMANN.
AXLE.
No. 472,762. Patented Apr. 12, 1892.
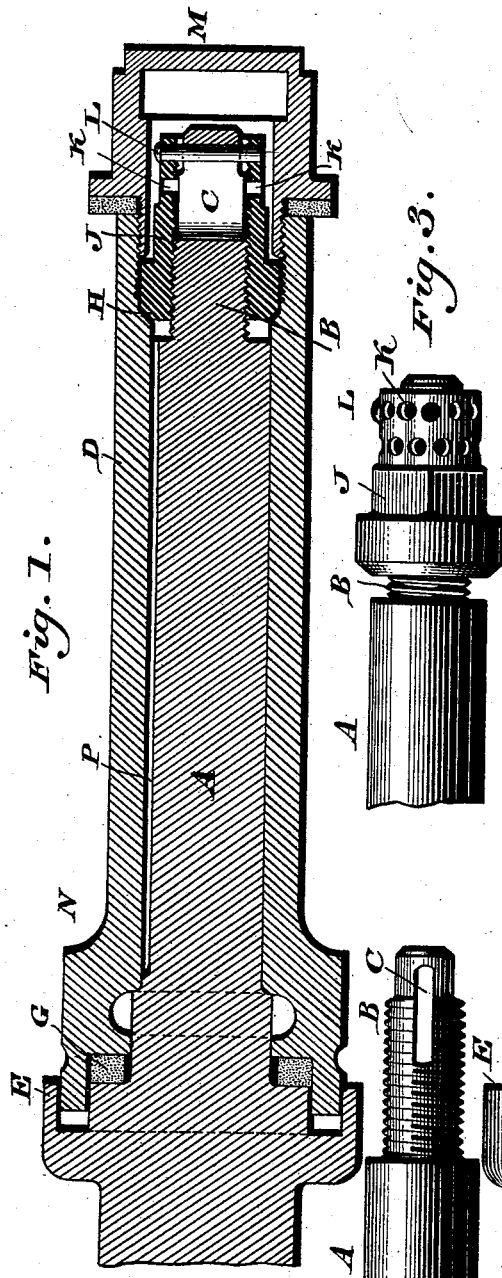
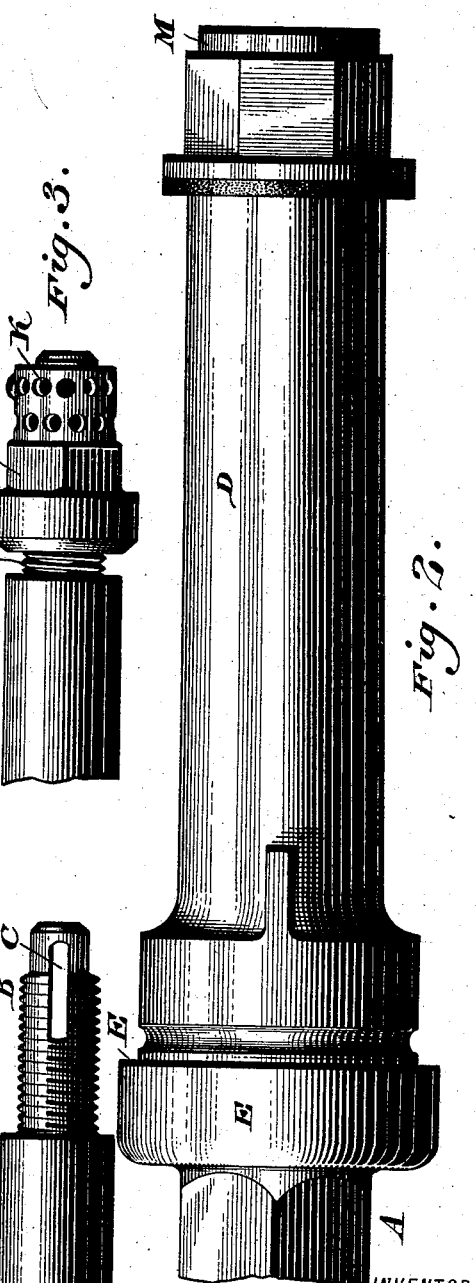
WITNESSES:
INVENTOR
Robert E. Lehmann
BY
ATTORNEY.

UNITED STATES PATENT OFFICE.

ROBERT EDUARD LEHMANN, OF PHILADELPHIA, PENNSYLVANIA.

AXLE.

SPECIFICATION forming part of Letters Patent No. 472,732, dated April 12, 1892.

Application filed August 3, 1891. Serial No. 401,471. (No model.)

*To all whom it may concern:*

Be it known that I, ROBERT EDUARD LEHMANN, a citizen of the United States, residing in the city and county of Philadelphia, State of Pennsylvania, have invented a new and useful Improvement in Axles, which improvement is fully set forth in the following specification and accompanying drawings.

My invention relates to improvements in axles for wagons, carriages, cars, and other vehicles; and it consists of a perforated cap for retaining the axle-box on the spindle.

It further consists of the combination of parts hereinafter described.

Figure 1 represents a longitudinal section of an axle embodying my invention. Fig. 2 represents a side view of the same. Fig. 3 represents a side view of a detail portion of the device. Fig. 4 represents a top view of a detail portion of the spindle, showing the slotted end thereof.

Similar letters of reference indicate corresponding parts in the several figures.

Referring to the drawings, A designates the spindle of an axle, having a reduced threaded portion B at its outer end with a longitudinally-extending vertical slot C therein, and D designates a sleeve fitted on said spindle and on which the hub of a wheel or pulley is secured. The inner end of the said sleeve is inserted in a cup or socket E, formed on the periphery of the axle, and suitable packing G is placed between abutting end portions of said sleeve and spindle.

A shoulder H is formed on the inner face of the sleeve D near its outer end, against which shoulder abuts the inner end of a collar J, secured on the threaded end B of the spindle. The said collar is provided with perforations K, adapted to register with the vertical slot C, so that a pin L, inserted in a perforation and the said slot, holds the sleeve D in place, preventing it from rotating on the spindle.

M designates a cap, which is secured to the outer end of the sleeve D for preventing the entrance of dirt between the parts and also the displacement of the pin L.

It will be seen that as the packing G between the abutting end portions of the sleeve D and the spindle B is worn the said sleeve can be moved inwardly on the spindle so as to allow for said wear, and the cap M and the pin L being removed the collar J can be tightened against said sleeve by being screwed inwardly on the threaded portion B, after which the pin L is inserted in a registering perforation and the slot C and the cap M is screwed on.

The sleeve D and spindle A are provided with channels N and P, respectively, for lubricating purposes; but such are old and well known.

In the drawings, two rows of perforations in the collar J are shown; but a more or less number may be made therein. The perforations of one row alternate with those of the adjacent row, so that more minute or delicate adjustment of the collar on the spindle may be had.

While the sleeve D may be made separate from the hub of a wheel, and the latter secured thereon, it may constitute the hub without departing from my invention.

Having thus described my invention, what I claim as new, and desire to secure by Letters Patent, is—

1. An axle having a spindle with a slotted threaded end, a longitudinally-adjustable sleeve with an inner shoulder, and a perforated collar on said threaded portion and bearing against said sleeve, said parts being combined substantially as described.

2. An axle having a spindle with a slotted threaded end, a longitudinally-adjustable sleeve having its inner end abutting against a projecting portion of the spindle, and provided on its inner surface, near its outer end, with a shoulder, a perforated collar working on said slotted threaded end of the spindle and bearing against the shoulder of said sleeve, and a cap on the outer end of the sleeve, said parts being combined substantially as described.

3. A slotted spindle and a perforated collar therein with a pin fitted in the slot of the spindle and a registering perforation of the collar with a longitudinally-adjustable sleeve, combined substantially as described.

4. In an axle, the collar J, having rows of perforations, the perforations of one row alternating with those of another row, substantially as and for the purpose set forth.

ROBERT EDUARD LEHMANN.

Witnesses:
JOHN A. WEIDERSHEIM,
A. P. JENNINGS.